United States Patent

Wolfram

Patent Number: 5,175,939
Date of Patent: Jan. 5, 1993

[54] GREENS MOWER HEIGHT CONTROL DEVICE

[76] Inventor: Herbert Wolfram, R.R. #2, Odessa, Ont. K0H 2H0, Canada

[21] Appl. No.: 869,500

[22] Filed: Apr. 16, 1992

[51] Int. Cl.⁵ .............................................. G01B 5/25
[52] U.S. Cl. ...................................... 33/628; 33/633; 33/655; 33/833; 33/412
[58] Field of Search .................. 33/624, 626, 628, 633, 33/635, 640, 645, 655, 832, 833, 836, 412, 452; 56/249

[56] References Cited

U.S. PATENT DOCUMENTS

| 3,664,029 | 5/1972 | Glucoff et al. | 33/412 |
| 4,594,785 | 6/1986 | Carlson | 33/833 |
| 5,031,335 | 7/1991 | Kimmelman | 33/628 |

FOREIGN PATENT DOCUMENTS

| 1027515 | 7/1983 | U.S.S.R. | 33/832 |
| 2080535 | 2/1982 | United Kingdom | 33/832 |

OTHER PUBLICATIONS

"Accu-Gage", Precision Tool Products Company, Catalog #001, Jul. 1987.

Primary Examiner—William A. Cuchlinski, Jr.
Assistant Examiner—Alvin Wirthlin
Attorney, Agent, or Firm—Richard J. Hicks

[57] ABSTRACT

A device for accurately setting the cutting height of a grass mower, especially a golf green mower in the field is described. A semi-rigid bar is placed between the rear fixed roller and the front adjustable roller of the mower and locked into place with a height adjusting screw which is set to a selected height-of-cut and releasably attached to the bed knife intermediate the front and rear rollers. A rigid bar is secured at the rear-end of the semi rigid bar and extends forwardly past the front roller. A spring loaded dial indicator is mounted at the forward end of the rigid bar and contacts the semi rigid bar so as to provide a reading of deflection of the semi rigid bar as the front roller is adjusted.

5 Claims, 2 Drawing Sheets

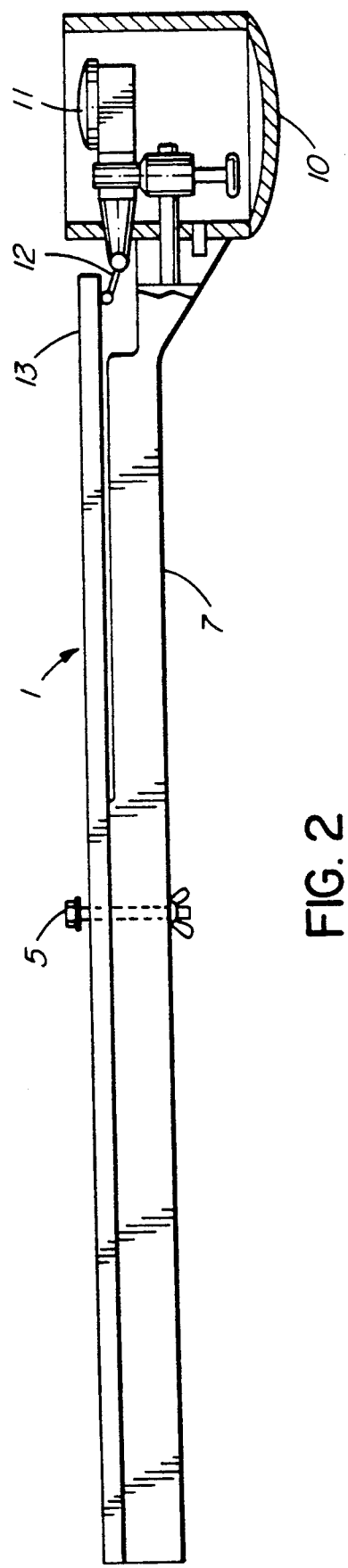
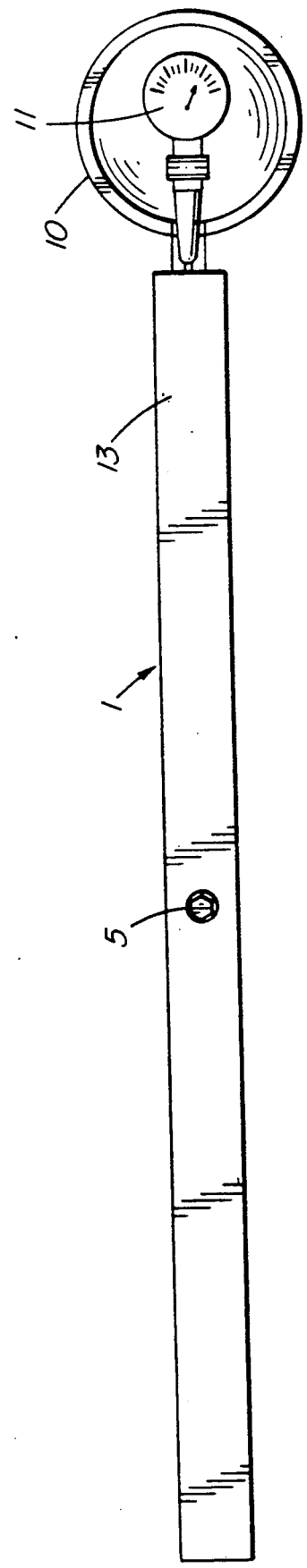
FIG. 2
FIG. 3

GREENS MOWER HEIGHT CONTROL DEVICE

FIELD OF INVENTION

This invention relates to a device for controlling the cutting height of a multiple head cutting device for mowing golf greens and the like.

BACKGROUND OF INVENTION

In the maintenance of high quality golf courses it is critical that the height of the grass, particularly the greens, be maintained extremely accurately. Modern greens mowers are generally gang mowers with three or more mowing heads and it is important that each head should cut at precisely the same height as its neighbours to within a very small tolerance which is of the order of a few thousandths of an inch, in order to maintain an accurate and true playing green without any ridges to affect the play of the ball. Even a ridge as small as a few thousandths can be detected quite readily by an expert golf player. There are, of course, measuring devices which can be adapted to a mowing head but generally such devices are awkward to use as they require dissassembly of the gang mower so that each head can be independently set or, at the very least inversion of the relatively heavy mowing head. these devices usually comprise a flat bar, which is placed over the front and rear rollers of an inverted mowing head which preferably has been removed from the mower, and a feeler which passes through the flat bar and contacts the front edge of the bedknife. The front roller can then be adjusted to give the desired cutting height as indicated by manual feel. Not only is this cumbersome to use in that at least two measurements per head must be taken to ensure that both sides of the blade are level but also the mowing head is heavy and difficult to invert to apply the bar and guage. The operation is, therefore, very time consuming. There is, therefore, a need for a simple and efficient device for measuring the cutting height of a multi-head greens mower which can be operated without either inverting or removing the mowing head from the mowing machine.

OBJECT OF INVENTION

An object of this invention is to provide a simple and accurate gauge to set the cutting height of a greens mower without inverting or removing the cutting head from the mowing device. The device of the present invention is particularly useful for multi head devices to ensure that all heads cut at precisely the same height.

BRIEF STATEMENT OF INVENTION

Thus by one aspect of this invention there is provided an apparatus for controlling grass cutting height in a mower having a fixed roller, an adjustable roller and an adjustable bed knife intermediate therebetween said apparatus comprising:

(a) a substantially rigid but deflectable first longitudinal member extendable between said fixed and adjustable rollers and releasably mountable on said bed knife;

(b) height adjusting means mounted on said first longitudinal member intermediate the ends thereof so as to releasably engage said bed knife at a selected height from said rollers;

(c) a substantially rigid second longitudinal member secured at one end thereof to said first longitudinal member at one end thereof; and (d) position indicator means mounted on said second longitudinal member at the other end thereof, and including means adapted to contact the other end of said first longitudinal member, so as to indicate deflection of said first longitudinal member when said adjustable roller is adjusted relative to said bed knife.

BRIEF DESCRIPTION OF DRAWINGS

FIG. 2 is a side view of the device of the present invention.

FIG. 3 is a plane view of the device of FIG. 2.

DETAILED DESCRIPTION OF PREFERRED EMBODIMENT

Figure 1:
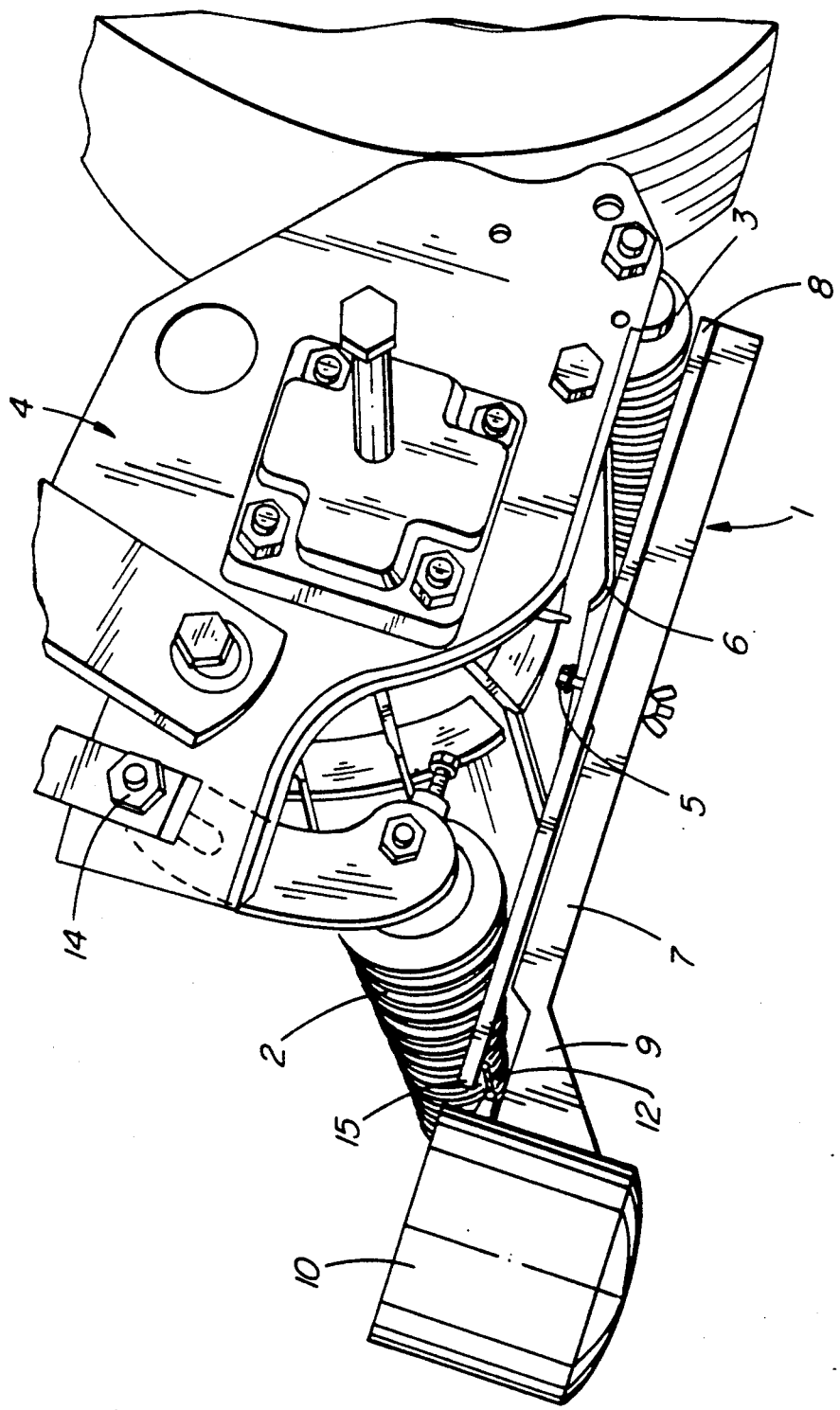
FIG. 1 is a perspective view of the device of the present invention mounted on a mowing head.

As can be seen most clearly in FIG. 1, the device of the present invention comprises a flat, substantially rigid aluminum, thermoplastic (such as P.V.C.) or steel bar 1 about 12", 14" or 17" long (depending on the size of the particular cutting unit), 1" wide and about $\frac{1}{4}$" thick which spans the distance between the front 2 and rear 3 rollers of a standard greens cutting head 4. An adjustable screw 5 is provided intermediate the ends of bar 1 and arranged to hook over the bed knife 6 of cutting head 4 at any selected height.

A second rigid bar 7 is secured rigidly to bar 1 at one end 8 thereof, such as by welding or riveting. In a preferred embodiment, bars 1 and 7 may be integrally formed. Bar 7 is somewhat heavier in section than bar 1 and is somewhat longer. At the free end 9 thereof there is provided a cup housing 10, usually formed of a thermoplastic material, wherein a spring loaded dial indicator 11 (as seen in FIGS. 2 and 3) is mounted. The feeler arm 12 of indicator 11 touches the underside of bar 1 adjacent the free end 13 thereof. The purpose of housing 10 is to protect the indicator 11 and it will be obvious that the device will operate whether or not the housing is in place.

In operation, the locking bolts 14 at both ends of front adjustable roller 2 are loosened. The adjusting screw 5 is adjusted to the desired cutting height of the grass, using a standard caliper or scale (not shown). The device is then placed on the cutting head adjacent one lateral side thereof so that the rear end 8 of bar 1 rests on rear roller 3 and the front end 15 of bar 1 rests on the loose front roller 2. The adjusting screw 5 is loosely hooked over the top of the bed knife 6, thus holding the device in place on the cutting head, which is preferably in the raised position. Note that it is not necessary to invert the cutting head completely, nor is it necessary to remove the cutting head from the mowing machine, thereby facilitating use in the field. The front roller 2 is then adjusted up or down as required so as to deflect the slightly flexible free end 15 of bar 1 and cause a reading of, say, 0.001" on the dial indicator 11, as arm 12 thereof is deflected. The locking nut 14 is then tightened. The procedure is repeated on the other lateral side of the cutting head so as to ensure the blade is parallel to the front roller 2. The same procedure is applied to the other cutting heads of a gang mower and it will be appreciated that all blades will thus be set to within an accuracy of about 0.001 inches.

I claim:

1. An apparatus for controlling grass cutting height in a mower having a fixed roller, an adjustable roller and an adjustable bed knife intermediate therebetween said apparatus comprising:

(a) a substantially rigid but deflectable first longitudinal member extendable between said fixed and adjustable rollers and releasably mountable on said bed knife;
(b) height adjusting means mounted on said first longitudinal member intermediate the ends thereof so as to releasably engage said bed knife at a selected height from said rollers;
(c) a substantially rigid second longitudinal member secured at one end thereof to said first longitudinal member at one end thereof; and
(d) position indicator means mounted on said second longitudinal member at the other end thereof, and including means adapted to contact the other end of said first longitudinal member, so as to indicate deflection of said first longitudinal member when said adjustable roller is adjusted relative to said bed knife.

2. An apparatus as claimed in claim 1 wherein said first and second longitudinal members are steel bars.

3. An apparatus as claimed in claim 2 wherein said height adjusting means comprises screw means rotatably mounted in said first longitudinal member.

4. An apparatus as claimed in claim 3 wherein said position indicator means comprises spring loaded means.

5. An apparatus as claimed in claim 4 wherein said means to contact the other end of said first longitudinal member comprises feeler means.

* * * * *